United States Patent [19]

Ghiringhelli

[11] 4,401,586

[45] Aug. 30, 1983

[54] PROCESS FOR THERMALLY EXPANDING SILICATE-BASED MATERIAL BY AN INFRARED HEAT SOURCE

[75] Inventor: Hugh A. Ghiringhelli, Wilton, Conn.

[73] Assignee: TS Leasing Associates, New York, N.Y.

[21] Appl. No.: 298,589

[22] Filed: Sep. 2, 1981

[51] Int. Cl.$^3$ .................... C04B 21/00; C04B 35/16
[52] U.S. Cl. ................ 252/378 R; 106/75; 252/378 P; 264/42; 501/85
[58] Field of Search .............. 252/378 R, 378 P; 106/75; 501/80, 81, 85; 264/42, 43

[56] References Cited

U.S. PATENT DOCUMENTS

| | | | |
|---|---|---|---|
| 2,553,759 | 5/1951 | Geiger | 501/81 |
| 3,719,510 | 3/1973 | Temple et al. | 106/75 |
| 3,743,601 | 7/1973 | Rao | 106/75 |
| 3,756,839 | 9/1973 | Rao | 106/75 |
| 3,765,919 | 10/1973 | Gelbman | 106/288 B |
| 3,830,892 | 8/1974 | Wada | 252/378 R |
| 4,203,773 | 5/1980 | Temple et al. | 106/75 |

*Primary Examiner*—Mark Bell
*Attorney, Agent, or Firm*—Alphonse R. Noe; Louis H. Reens

[57] ABSTRACT

Silicate-based composition particles are rapidly and completely expanded to form an expanded, cellular particulate aggregate of maximum density in short periods of time at particle temperatures which are comparatively low, that is, 100° C., compared to existing systems by the utilization of infrared heat sources, either gas or electric, to heat the silicate particles. The use of infrared energy operates in a surprisingly advantageous fashion when the expansion process is carried out on or in the presence of a surface having the capacity to act as a thermal mirror or absorber-reflector of the infrared radiation to make maximum utilization of the radiant energy by the creation of a radiation trap. Carbonaceous materials are preferred for producing such entrapment. A further significant aspect is the discovery of a time-radiation dependency. Thus, an optimum time of exposure for expansion-radiation wave length relationship can be determined so that one may have finite control over expansion of the particles at the least energy cost.

8 Claims, No Drawings

PROCESS FOR THERMALLY EXPANDING SILICATE-BASED MATERIAL BY AN INFRARED HEAT SOURCE

BACKGROUND OF THE INVENTION

This invention relates to the production of inorganic silicate materials and, more particularly, to a method of thermally expanding silicate-based compositions to produce lightweight, cellular aggregate processing advantageous acoustic and thermal insulating and fireproofing properties.

The production of expanded silicate aggregate by thermal expansion is well known. U.S. Pat. No. 3,765,919 discloses a process of producing a silicate material capable of being expanded at a construction site, or as part of the manufacturing process, by the application of heat. This is achieved in an "expander-dryer" in the form of a rotary calciner in which heated air at elevated temperatures, between 880° and 1,020° F. is utilized. A preexpansion can be achieved in an "oven-dryer" at temperatures of 350° to 400° F. U.S. Pat. No. 3,719,510 discloses a process of preparing an expanded insoluble silicate aggregate in which a silicate composition is ground, after mixing and curing, to a particulate form and subsequently expanded by exposure to temperatures of 800° to 1,800° F. to obtain rapid and complete expansion.

U.S. Pat. No. 4,203,773 states that the processes described in U.S. Pat. Nos. 3,719,510 and 3,765,919 involve several steps which are difficult to control and discloses an alleged improved method for preparing waterinsoluble expanded silicate aggregate in which particles are thermally expanded by rapid heating to at least 425° C. and generally in an effective range of 425°–750° C.

U.S. Pat No. 2,553,759 discloses a method for making porous refractory bodies by coating combustible globules with finely divided refractory material, drying the same on a vibrating table by the use of suitable heating means such as infrared lamps and then firing the dried globules under oxidizing conditions at a temperature sufficient to burn out the combustible material from the interior and cause the desired sintering. U.S. Pat. No. 3,743,601 discloses a process for forming microcellular, inorganic silicate foams by expanding hydrated particulate silicates by thermal energy supplied by a source of conventional heat, microwave energy, dissipation of mechanical energy and/or an exothermic reagent to provide part or all the heat input. Alternatively, the hydrated mass can be uniformly heated under sufficient pressure to prevent loss by evaporation of the water of hydration which, upon rapid release of the pressure, will act as a blowing agent and expand the mass. When microwave energy is utilized, it is applied at a frequency of 2450 megacycles. U.S. Pat. No. 3,756,839 also discloses the production of alkali metal silicate foam involving the rapid input of heat energy which, the patent states, may be supplied by commercially available heating means such as a radiant heat oven, a convection oven or, in particular, a microwave oven. In a conventional convection or radiant heat oven the material is heated to 500° C. for one hour.

U.S. Pat. No. 3,830,892 discloses a method for manufacturing a molded article of expanded vermiculite which comprises subjecting vermiculite to heating or radiation with electromagnetic waves in the presence of urea or thiourea and, during or after the process, allowing the vermiculite to contact with an aqueous solution of ammonium or alkali silicate. The patent states that vermiculite is generally expanded at temperatures beyond a critical level of 800° C. The treated vermiculite is expanded, according to the patent process, by heating at a temperature of 160° to about 500° C., desirably about 220° C., for about 10 minutes to one hour or by radiating the vermiculite with electromagnetic waves. The electromagnetic waves employed are said to be usually microwave or far infrared radiation in which instance the duration of radiation ranges from fractions of a second to thirty minutes. The electromagnetic waves may be supplied by any known sources such as an electronic range or high frequency welder.

Thus, it can be seen that the prior heat processes used to cause expansion of inorganic silicate particles are relatively energy intensive. Thus, such processes generally require heating the particles to extremely high temperatures to produce an expanded particle of acceptable density. The processes used for expansion may vary somewhat but generally depend on heating air to high temperatures, 1000° F. or more, and contacting the particles with this air at high velocity or utilize rotating pipes heated to temperatures in excess of the reaction temperatures of expanders and allowing the particles to contact the surface of the pipes during rotation until sufficiently expanded. Since the particles to be expanded are generally considered to be thermal insulators, as well as to some extent refractory, rapid thermal expansion requires a sufficient amount of heat to overcome the inherent insulating properties of the particles so that uniform expansion to the proper density may occur in as short a time as possible. Alternatively, at lower temperatures long residence times have generally been required to achieve the desired expansion. Consequently, the efficiency of the expansion processes heretofore disclosed possess disadvantages for practical commercial application in which the most economical use of heat energy is desirable.

SUMMARY OF THE INVENTION

I have discovered that the inefficiency of the prior art processes may be avoided and inorganic silicate-based composition particles rapidly and completely expanded to form an expanded, cellular particulate aggregate of maximum density in short periods of time that is, less than a minute, at particle temperatures which are comparatively low, that is, 100° C., compared to existing systems. This is achieved, according to my invention, by the utilization of infrared heat sources, either gas or electric, to heat the silicate particles.

Thus, an object of my invention is the provision of a method for expanding inorganic silicate-based composition particles through the use of infrared energy.

The use of infrared energy surprisingly operates in an even more advantageous fashion when the expansion process is carried out on or in the presence of a surface having the capacity to act as a thermal mirror or absorber-reflector of the infrared radiation. Thus, maximum utilization may be made of the radiant energy by the creation of a radiation trap. Preferred materials for producing such entrapment are, for example, graphites, carbons, carbides and the like while the thermal mirror, although not as efficient, may nevertheless comprise stainless steel or aluminum.

Accordingly, a further object of my invention is the provision of a method for expanding inorganic silicate-based composition particles by subjecting the particles to infrared energy in the presence of a thermal mirror or an absorber-reflector of the infrared radiation to obtain maximum utilization of the same.

A further significant aspect of my invention is the discovery of a time-radiation dependency. Thus, an optimum time of exposure for expansion-radiation wave length relationship can be determined so that one may have finite control over expansion of the particles at the least energy cost.

Thus, a yet further object of my invention is the provision for a method for controllably expanding inorganic silicate-based composition particles by observing an optimum exposure time-infrared radiation wavelength relationship.

The foregoing and other objects, features and advantages of my invention will be further apparent from the following description of preferred embodiments thereof taken in connection with the accompanying claims.

DESCRIPTION OF THE PREFERRED EMBODIMENTS

The process of the invention can be carried out utilizing any inorganic silicate composition material capable of being thermally expanded, for example, the types described in the prior patents referred to above.

A hopper loaded with dry hydrated silicate particles, of the type described in U.S. Pat. No. 4,203,773, is positioned ahead of a vibrating surface and arranged to feed the vibrating surface at the rate of 250 lbs. of particles per hour. The particles are of mixed size representing a range from less than 8 mesh to greater than 80 mesh, U.S. Sieve Series, with a density of approximately 62 lbs. per cubic foot. Gas infrared heaters are mounted directly above the vibrating surface at a distance of approximately 4 inches from the travel path of the particles and define two expansion zones. The first zone is 11 inches deep by 18 inches wide while the second zone is 11 inches deep by 30 inches wide. The particles travel through the 11 inch dimension and along the 18 and 30 inch dimensions of the two zones. The residence time in each zone is approximately five seconds. This residence time may be controlled by adjusting the amplitude of the vibratory surface as well as the angle of the plane of the surface.

Upon emergence from the first zone, the particles are allowed to spread to the 30 inch dimension. This added width is to accomodate the expanded condition of the particle growth that occurs in the first zone since the volume of the particles increases from 5 to 15 times the original size during exposure in the first zone. During exposure in the second zone, the particles at least double in volume again and upon emergence from the second zone, the total expansion will constitute an increase in volume of 20 to 30 times the original particle size. As a result, the density of the particles decreases from 62 lbs. per cubic foot to approximately 2 to 2.5 lbs. per cubic foot with a corresponding increase in volume.

As an alternative to the above process, expansion can be achieved in a single zone of sufficient length. However, the greatest and most effective energy utilization is obtained, according to my invention, with zoned expansion. Since zoned expansion also better accomodates the ever increasing particle volume, the zoned expansion process offers better efficiency over the single zone method. It will be understood that the means of conveyance through the infrared zones is not limited to vibratory conveyance but may be accomplished through any other equivalent means such as a rolling conveyor, a short burst of controlled air or even by drop fall providing the residence time is sufficiently long to allow the particles to reach their radiating stage.

There exists an expansion time-radiation wave length dependency which may be utilized to obtain optimum expansion of particles at the least energy cost. Thus, it was surprisingly found that the wave length of the infrared radiation is directly related to the time interval required for expansion. For example, a gas infrared heater was positioned four inches above particles to be expanded and the particles permitted to remain stationary while the infrared source was varied from a wave length of 3.5 microns down to 1.8 microns. The samples of particles were all of the same size. The results are shown in Table I.

TABLE I

| Run | Radiation Wavelength, Microns | Expansion Time, Seconds |
| --- | --- | --- |
| 1 | 3.5 | 35 |
| 2 | 3.3 | 28 |
| 3 | 2.7 | 15 |
| 4 | 2.5 | 12 |
| 5 | 2.2 | 9 |
| 6 | 2.0 | 11 |
| 7 | 1.8 | fusion (particles molted) |

The results set forth in Table I demonstrate that an optimum expansion time-wave length relationship can be determined according to my invention. Thus, those skilled in the art will readily recognize that by varying parameters to suit the particular process and end result desired the operator may have finite control over expansion of the particles at the least energy cost. Similar results were obtained by utilizing infrared radiation produced from electric sources.

A specific advantage of the process of this invention is that the temperatures of the particles themselves may be maintained relatively low compared to previous systems. Since infrared radiation does not heat the ambient air and consequently produces very little convection, the particle itself is excited by the infrared source which causes sufficient internal molecular excitement to achieve the rapid expansion even though the inherent particle temperature may not exceed 100° C. Although the full effect of this excitation is not fully understood, it is believed that it must be due, at least in part, to both the absorption and emissivity spectrum of the particle, in effect causing the particle itself to act as a radiator bouncing the infrared internally through its structure. In such instance this would create high work efficiency of the energy input and obviate the need to heat to extraordinarily high temperatures to achieve the same effect.

Microwave energy is not the equivalent of infrared energy nor can it achieve the same result in the present process. Microwave and infrared radiation are at opposite ends of the electromagnetic spectrum. Microwave radiation is that portion of the electromagnetic spectrum lying between the far infrared and the conventional radio frequency portion. The microwave region is commonly regarded as extending from one millimeter to thirty centimeters in wave length. Infrared radiation is that band of electromagnetic wave length lying between the extreme of the visible, approximately 0.75 microns, and the shortest microwaves which are approximately 1,000 microns, that is, one millimeter. In addition, while infrared radiation can arise from electrical or gas sources, microwave cannot be generated by a gas device.

The results obtained according to the process of this invention using infrared radiation are surprising and unexpected. For example, an attempt to expand silicate particles using radio frequency, that is, microwave, resulted in only 25 percent of the particles being expanded after 70 seconds. This length of time is more than twice that of the longest time shown in Table I for the use of infrared radiation and is inefficient since 75 percent of the particles remain unexpanded. Therefore, microwave radiation is not only technically different than infrared radiation as described above, but furthermore is unacceptable in a process in which rapid thermal expansion of silicate particles is desirable.

The thermal expansion of inorganic silicate particles using infrared radiation according to my invention can be even further enhanced by utilizing infrared rediation traps to increase the efficiency of energy use. This was demonstrated by using an infrared radiation source emitting at a wavelength of 2.2 microns. The particles to be expanded, having a density of approximately 62 lbs. per cubic foot, were placed in a stationary position in substrates of substantially different materials having the capacity to act as thermal mirrors or absorber-reflectors of the infrared radiation so that a "radiation trap" was created. The time required for expansion and the resultant particle densities are set forth in Table II for the various substrates employed.

TABLE II

| Substrate | Expansion Time, Seconds | Expanded Particle Density, lbs./ft.$^3$ |
|---|---|---|
| Aluminum | 15 | 15 |
| Stainless Steel | 12 | 14 |
| Graphite | 10 | 2.5 |
| Pyrex | 18 | 8 |
| Carbon | 10 | 2.6 |

The results of Table II demonstrate that entrapment of the infrared radiation and "re-radiation" contributes materially to the efficiency of the expansion process and that supporting materials made of or compounded with graphite and carbon and other materials of the carbonacious family, such as carbide, can provide an important advantage in the process.

I claim:

1. In a process for producing expanded inorganic silicate particles comprising subjecting thermally expandable hydrated silicate-based composition particles to infrared radiation in a range extending below and including 3.5 microns to heat the particles so as to obtain expansion thereof at a low temperature with a particle temperature of approximately 100° C. and with essentially complete expansion of the particles when subjected to the infrared radiation being achieved in less than a minute.

2. The improved process as claimed in claim 1 wherein the particles are subjected to infrared radiation in two successive zones, the second of which is greater in volume than the first zone.

3. The improved process as claimed in claim 1 wherein the particles are supported on a substrate which acts as a reflector-absorber of the infrared radiation to which it is being subjected.

4. The improved process as claimed in claim 3 wherein the substrate is made of a carbonaceous material.

5. The improved process as claimed in claim 4 wherein the carbonaceous substrate material is one selected from the group consisting of carbon and graphite.

6. The improved process as claimed in claims 1, 2 and 3 further comprising varying the wave length of the infrared radiation to control the time required to expand the particles.

7. The improved process as claimed in claim 6 wherein the time required to expand the particles decreases as the infrared radiation wavelength is decreased.

8. The improved process as claimed in claim 1 wherein the infrared radiation wavelength is in the range of 2.0 to 3.5 microns.

* * * * *